(12) United States Patent
Koo

(10) Patent No.: US 9,251,401 B1
(45) Date of Patent: Feb. 2, 2016

(54) FACIAL RECOGNITION TO POSITIVELY IDENTIFY A LIVE PERSON SUBJECT

(71) Applicant: Narus, Inc., Sunnyvale, CA (US)

(72) Inventor: Sing Koo, Cupertino, CA (US)

(73) Assignee: Narus, Inc., Sunnyvale, CA (US)

( * ) Notice: Subject to any disclaimer, the term of this patent is extended or adjusted under 35 U.S.C. 154(b) by 154 days.

(21) Appl. No.: 13/776,675

(22) Filed: Feb. 25, 2013

(51) Int. Cl.
*G06K 9/00* (2006.01)
*G06F 17/30* (2006.01)

(52) U.S. Cl.
CPC ...... *G06K 9/00241* (2013.01); *G06F 17/30598* (2013.01)

(58) Field of Classification Search
CPC .......... G06K 9/00228; G06K 9/00221; G06K 9/00288; G06K 9/00281; G06K 9/00248
USPC ......................................................... 382/118
See application file for complete search history.

(56) References Cited

U.S. PATENT DOCUMENTS 8,542,879 B1 * 9/2013 Nechyba et al. .............. 382/103

OTHER PUBLICATIONS (Maria De Marsico, "Moving Face Spoofing Detection via 3D Projective Invariants", Mar. 2012, IEEE).*

* cited by examiner

*Primary Examiner* — Siamak Harandi
(74) *Attorney, Agent, or Firm* — Kwan & Olynick LLP

(57) ABSTRACT

A method for authenticating a live person subject. The method includes receiving an authentication request from a user, generating a sequence of instructions instructing the user to point a face toward a sequence of facial directions, wherein the sequence of facial directions are randomly generated using a random sequence generation algorithm, presenting the sequence of instructions to the user, capturing, while presenting the sequence of instructions to the user, a sequence of live-captured facial images (LCFIs) based on a pre-determined frame rate, and generating an authentication result identifying the user as the live person subject by at least, matching the sequence of LCFIs to multiple reference facial images of the live person subject and validating each LCFI in the sequence of LCFIs based on a pre-determined criterion.

19 Claims, 5 Drawing Sheets

US 9,251,401 B1

FACIAL RECOGNITION TO POSITIVELY IDENTIFY A LIVE PERSON SUBJECT

BACKGROUND OF THE INVENTION

Facial recognition is an important part of any multi-factor identification system. Many existing arts in facial recognition algorithms analyze, in a learning phase, facial features of a reference facial image to obtain a set of reference attributes that positively identify the person subject of the reference facial image. The set of reference attributes is then compared with new facial features of a given facial image. The comparison result is then evaluated to determine percent of confidence in recognizing the given facial image and the reference facial image as being of the same person subject. Such prior art method may be used for user authentication by identifying a live-captured facial image of a user based on the user's pre-recorded reference facial image. However, this user authentication scheme can be defeated by an unauthorized user presenting a photograph of the authorized user to mimic the live-captured facial image.

SUMMARY

In general, in one aspect, the present invention relates to a method for authenticating a live person subject. The method includes receiving an authentication request from a user, generating, in response to the authentication request, a sequence of instructions instructing the user to point a face of the user toward a sequence of facial directions, wherein the sequence of facial directions are randomly generated using a random sequence generation algorithm, presenting the sequence of instructions to the user, wherein a first instruction instructing the user to point the face toward a first facial direction, wherein the second instruction instructing the user to point the face toward a second facial direction, capturing, while presenting the sequence of instructions to the user, a sequence of live-captured facial images (LCFIs) based on a pre-determined frame rate, and generating an authentication result identifying the user as the live person subject by at least, matching a LCFI in the sequence of LCFIs to a first reference facial image of the live person subject toward the first facial direction, matching another LCFI in the sequence of LCFIs to a second reference facial image of the live person subject toward the second facial direction, and validating each LCFI in the sequence of LCFIs based on a pre-determined criterion.

Other aspects and advantages of the invention will be apparent from the following description and the appended claims.

DETAILED DESCRIPTION

Figure 1:
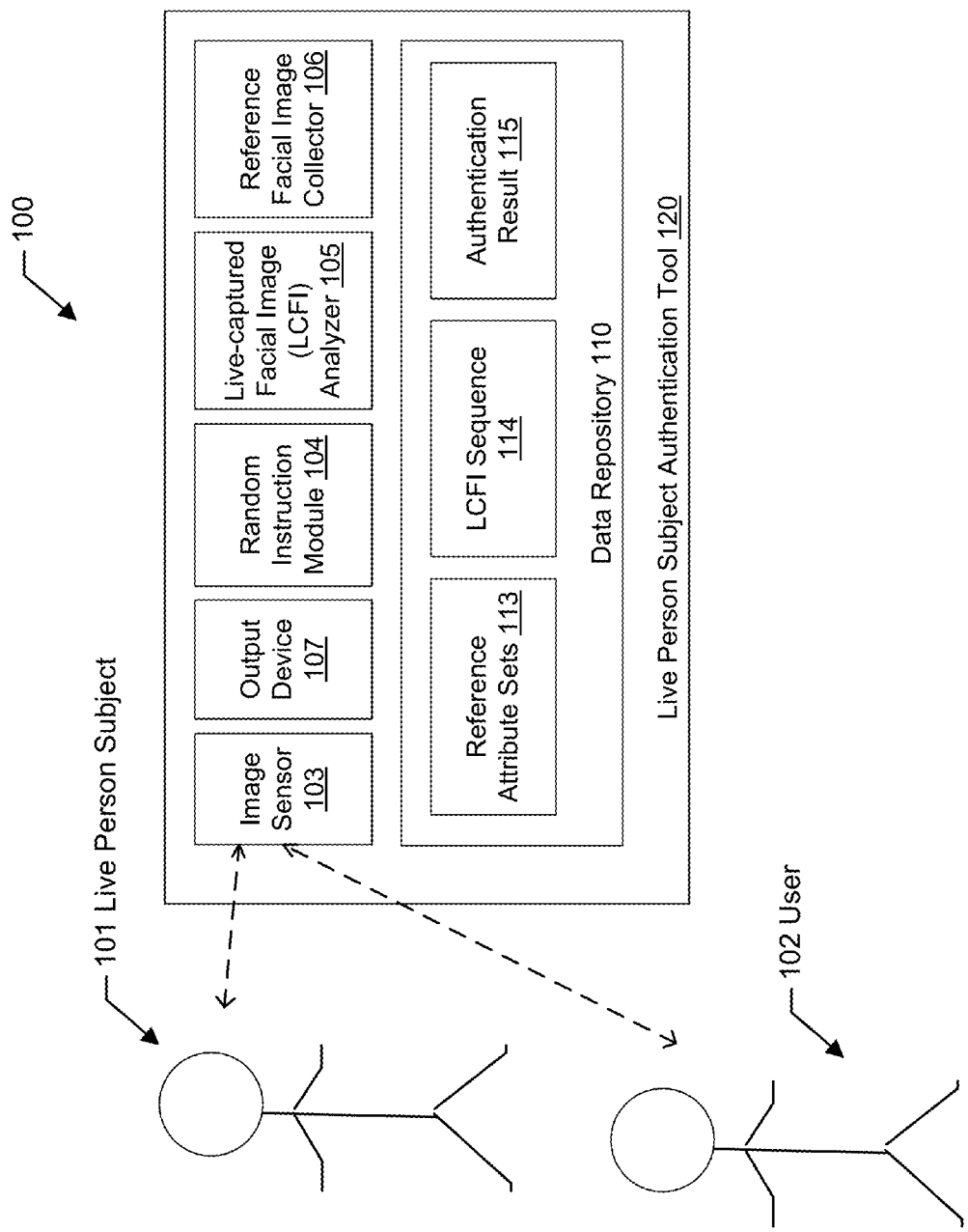
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, and computer readable medium for facial recognition to positively identify or authenticate a live person subject based on a sequence of live-captured facial images (LCFIs) captured according to a set of dynamically generated instructions. In a LCFI, the subject of the image is a live person. In one or more embodiments, the LCFI is captured (e.g., using a computer camera or other suitable image sensor) from the live person at the time of authentication. Throughout this disclosure, the terms "live person," "live person subject," and "live subject person" may be used interchangeably depending on the context.

In one or more embodiments, during the learning phase, a dynamically generated instruction set is used to instruct the live person subject to move his/her face by looking at a sequence of visual targets displayed at different locations on the computer screen. A set of reference facial images are captured while the live person's face is positioned toward each of the visual targets. These reference facial images are then analyzed to generate individual attribute set (referred to as a reference attribute set) for each reference facial image. In one or more embodiments, during the recognition phase, a random sequence generation algorithm is used to generate a sequence of visual targets on the computer screen, and instruct a user to move his/her face by following these visual targets. In one or more embodiments, during the recognition phase, a random sequence generation algorithm is used to generate a sequence of verbal instructions that instruct a user to move his/her face toward a sequence of facial directions. The computer camera then captures the sequence of LCFIs as the user's face is positioned to look at these visual targets or positioned toward these verbally instructed facial directions. By matching features extracted from these LCFIs to the reference attribute sets, the user in front of the computer camera is recognized as indeed the live person from whom the reference facial images are captured.

FIG. 1 shows a diagram of a system (100) for facial recognition to positively identify a live person subject in accordance with one or more embodiments. In one or more embodiments of the invention, one or more of the components shown in FIG. 1 may be omitted, repeated, and/or partitioned in a different manner. Accordingly, embodiments of the invention should not be considered limited to the specific arrangements of components shown in FIG. 1.

As shown in FIG. 1, the system (100) includes a live person subject authentication tool (120), a live person subject (101), and a user (102). The live person subject authentication tool (120) includes an image sensor (103), an output device (107), a random instruction module (104), a LCFI analyzer (105), a reference facial image collector (106), and a data repository (120) storing reference attribute sets (113), LCFI sequence (114), and authentication result (115). In one or more embodiments of the invention, each of the live person subject (101) and the user (102) may be an individual person. For example, they may the same person and result in a positive authentication result (115). In another example, they may be different persons and result in a negative authentication result (115). Each of components shown in FIG. 1 is described below. One of ordinary skill in the art will appreciate that embodiments are not limited to the configuration shown in FIG. 1.

In one or more embodiments of the invention, the live person subject authentication tool (120) includes the reference facial image collector (106) that is configured to obtain, during a learning phase, a number of reference facial images of the live person subject (101) corresponding to a number of facial directions of the live person subject (101). In one or more embodiments, reference attribute sets (113) are extracted from these reference facial images to represent facial features of the live person subject (101) observed along these facial directions. As shown in FIG. 1, the extracted reference attribute sets (113) are stored in the repository (110) for use during a subsequent recognition phase. In one or more embodiments, these reference facial images of the live person subject (101) are captured using the image sensor (103) when the live person subject (101) follows the aforementioned dynamically generated instruction set that is generated by the random instruction module (104). For example, the particular facial directions and how many of them are dynamically generated when the live person subject (101) participates in the learning phase. Specifically, the particular facial directions and how many of them may be different for a different live person other than the live person subject (101), or different each time the live person subject (101) participates in the learning phase. An example of the learning phase is described in reference to FIG. 3A below.

Figure 3A:
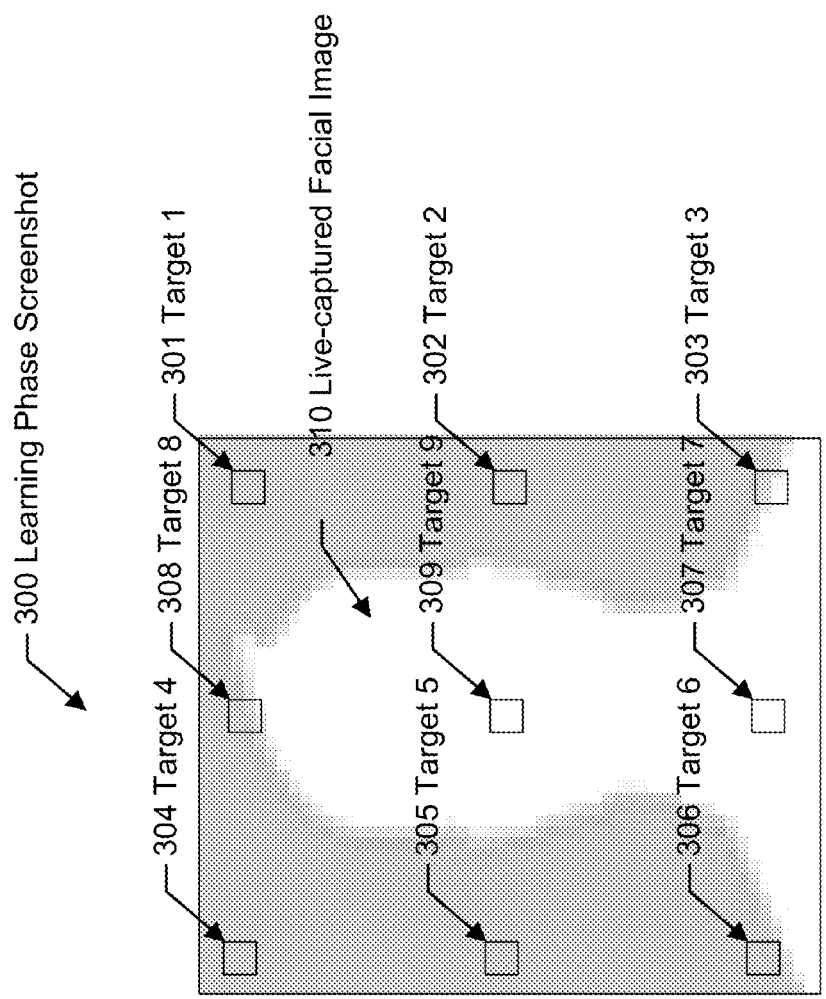
FIGS. 3A-3B show an example according to aspects of the invention.
Figure 3B:
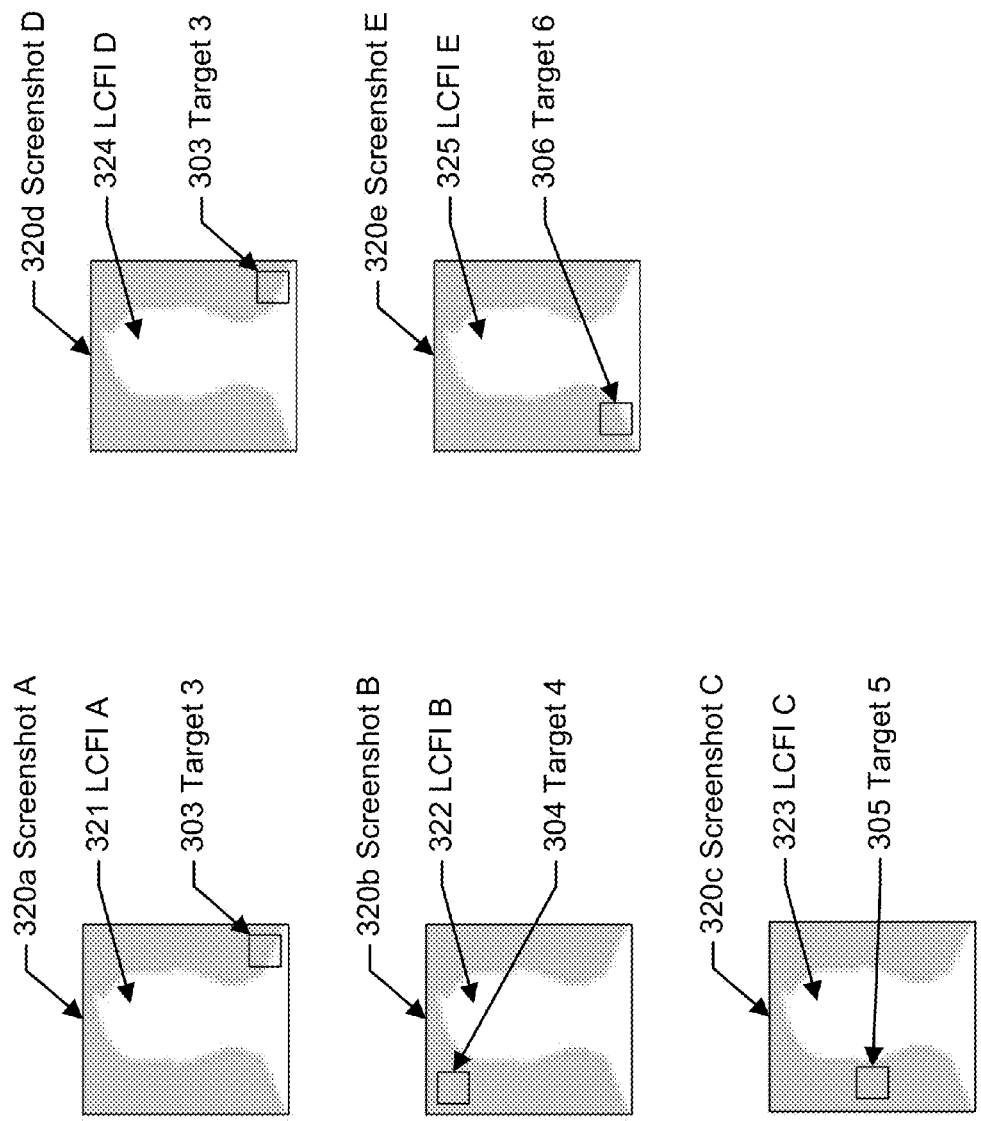

In one or more embodiments of the invention, in addition to generating the learning phase instructions, the random instruction module (104) is further configured to generate recognition phase instructions. Specifically, the random instruction module (104) receives an authentication request from the user (102) during a learning phase that is subsequent to the learning phase. In response, the random instruction module (104) generates a sequence of instructions (referred to as the recognition phase instructions) instructing the user (102) to point his/her face toward a sequence of facial directions. In one or more embodiments, the sequence of facial directions is randomly generated using a random sequence generation algorithm. For example, during the recognition phase, the random instruction module (104) presents a first instruction to the user (102) instructing the user (102) to point the face toward a first randomly generated facial direction, and presents a second instruction to the user (102) instructing the user (102) to point the face toward a second randomly generated facial direction. An example of the recognition phase instructions is shown in FIG. 3B below.

In one or more embodiments of the invention, the live person subject authentication tool (120) includes the image sensor (103) that is configured to capture, while the sequence of instructions are being presented to the user (102) by the random instruction module (104), a sequence of live-captured facial images (LCFIs) based on a pre-determined frame rate. For example, the image sensor (103) captures the sequence of LCFIs under control of the random instruction module (104). Accordingly, each LCFI corresponds to one of the facial directions in the sequence of facial directions specified by the recognition phase instructions. In other words, the sequence of LCFIs includes one LCFI corresponding to the aforementioned first randomly generated facial direction, and another LCFI corresponding to the aforementioned second randomly generated facial direction. As shown in FIG. 1, the sequence of LCFIs is stored in the repository (110) as the LCFI sequence (114). In one or more embodiments, the LCFI sequence (114) includes LCFIs corresponding to at least a portion of facial directions of the reference facial images. Accordingly, the LCFI sequence (114) may be compared to the reference attribute sets (113) to determine facial feature similarity between the live person subject (101) and the user (102). In one or more embodiments, the pre-determined frame rate is chosen such that the LCFI sequence (114) further includes additional LCFIs for the purpose to ensure that there is no breakage of facial image continuity in the LCFI sequence (114). In particular, any breakage of facial image continuity in the LCFI sequence (114) suggests potential malicious act by the user (102), such as substituting his/her live face in front of the image sensor (103) by pre-recorded facial images. In one or more embodiments, the pre-determined frame rate is a constant frame rate, such as 30 frames per second that is sufficiently high to capture any potential substituting act of the user (102). In one or more embodiments, the pre-determined frame rate is a variable frame rate, such as dynamically generated by the random instruction module (104).

In one or more embodiments of the invention, the live person subject authentication tool (120) includes the LCFI analyzer (105) that is configured to generate the authentication result (115) that is stored in the repository (110). For example, the authentication result (115) may identify the user (102) as the same as the live person subject (101) if (i) the sequence of LCFIs is determined to include all reference facial images specified by the recognition phase instructions, and (ii) the sequence of LCFIs is validated as free of any breakage of facial image continuity based on a pre-determined criterion. In one or more embodiments, to confirm the requirement (i), target LCFIs are selected from the LCFIs sequence (114) based on time points when each of the recognition phase instructions is presented during the recognition phase to the user (102). In addition, at least a portion of the reference attribute sets (113) are selected corresponding to those reference facial images specified by the recognition phase instructions. Accordingly, the target LCFIs are compared to the selected portion of the reference attribute sets (113) to determine whether the LCFIs sequence (114) indeed include all reference facial images specified by the recognition phase instructions. In one or more embodiments, to confirm the requirement (ii), a difference measure between two consecutive LCFIs in each consecutive LCFI pair in the LCFIs sequence (114) is generated. The sequence of LCFIs is then validated as free of any breakage of facial image continuity if each of all difference measures is less than a pre-determined threshold.

In one or more embodiments, the live person subject authentication tool (120) may include the output device (107) for presenting the aforementioned dynamically generated instruction set during the learning phase, and presenting the visual targets or verbal instructions during the recognition phase. The output device (107) may be a display unit, such as a two dimensional (2D) or a three dimensional (3D) display configured to display information regarding the dynamically generated instruction set and/or the visual targets. Alternatively, the output device (107) may be an audio device, such as a speaker configured to play back the dynamically generated instruction set and/or the verbal instructions.

In one or more embodiments, a central processing unit (CPU, not shown) of the live person subject authentication tool (120) is configured (e.g., programmed) to execute instructions to operate the components of the live person subject authentication tool (120). In one or more embodiments, the memory (not shown) of the live person subject authentication tool (120) is configured to store software instructions for performing various functionalities of the live person subject authentication tool (120). The memory may be one of a variety of memory devices, including but not limited to random access memory (RAM), read-only memory (ROM), cache memory, and flash memory. The memory may be further configured to serve as back-up storage for information stored in the data repository (120).

In one or more embodiments, the data repository (110) is a persistent storage device (or set of devices) and is configured to receive working data from, and to deliver working data to various components of the live person subject authentication tool (120). The data repository (110) may be a data store (e.g., a database, a file system, one or more data structures configured in a memory, some other medium for storing data, or any suitable combination thereof), which may include information related to authenticating the user (102) as the live person subject (101). The data repository (110) may be a device internal to the live person subject authentication tool (120). Alternatively, the data repository (110) may be an external storage device operatively connected to the live person subject authentication tool (120).

The live person subject authentication tool (120) may further include one or more system computers, which may be implemented as a server or any conventional computing system having a hardware processor. However, those skilled in the art will appreciate that implementations of various technologies described herein may be practiced in other computer system configurations known to those skilled in the art.

Figure 2:
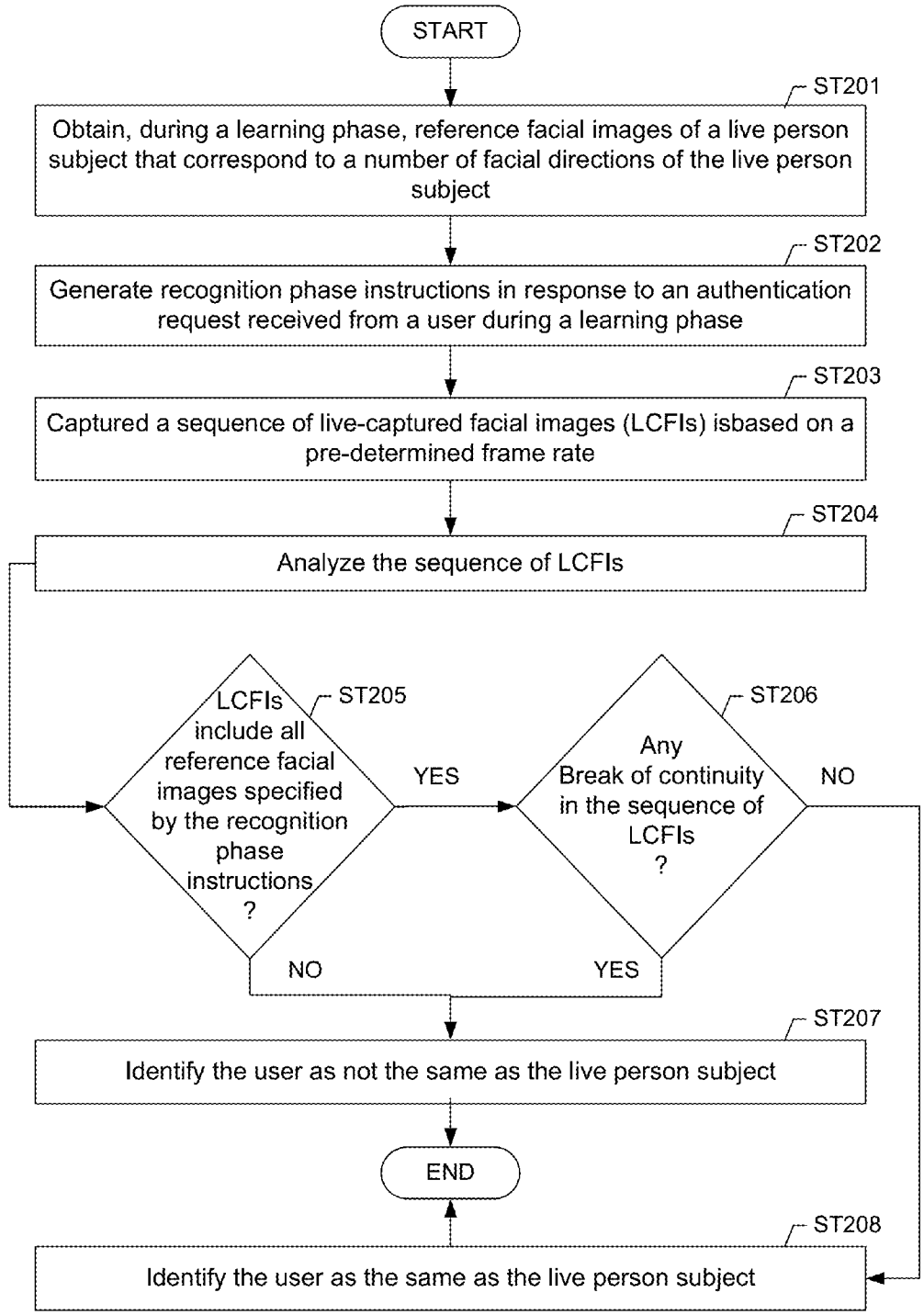
FIG. 2 shows a flowchart of a method according to aspects of the invention.

FIG. 2 depicts a flowchart of method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the methods depicted in FIG. 2 may be practiced using system (100) described with respect to FIG. 1 above.

Initially in Step 201, during a learning phase, a number of reference facial images of a live person subject is obtained that correspond to a number of facial directions of the live person subject. In one or more embodiments, reference attribute sets are extracted from these reference facial images to represent facial features of the live person subject observed along these facial directions. In particular, these extracted reference attribute sets are stored for use during a subsequent recognition phase. In one or more embodiments, these reference facial images of the live person subject are captured using a image sensor (e.g., a computer camera) when the live person subject follows a dynamically generated instruction set that is generated using a random sequence generation algorithm. For example, the particular facial directions and how many of them are dynamically generated when the live person subject participates in the learning phase. Specifically, the particular facial directions and how many of them may be different for a different live person other than the live person subject, or different each time the live person subject participates in the learning phase. An example of the learning phase is described in reference to FIG. 3A below.

In Step 202, a sequence of instructions (referred to as the recognition phase instructions) is generated in response to an authentication request received from a user during a learning phase that is subsequent to the learning phase. In one or more embodiments, the recognition phase instructions instruct the user to point his/her face toward a sequence of facial directions. In one or more embodiments, the sequence of facial directions is randomly generated using the aforementioned random sequence generation algorithm. For example, during the recognition phase, a first instruction may be presented to the user instructing the user to point the face toward a first randomly generated facial direction. Further, a second instruction may be presented to the user instructing the user to point the face toward a second randomly generated facial direction.

In Step 203, while the recognition phase instructions are being presented to the user, a sequence of live-captured facial images (LCFIs) is captured based on a pre-determined frame rate. In one or more embodiments, each LCFI corresponds to one of the facial directions specified by the recognition phase instructions. In other words, the sequence of LCFIs includes one LCFI corresponding to the aforementioned first randomly generated facial direction, and another LCFI corresponding to the aforementioned second randomly generated facial direction. In one or more embodiments, the LCFI sequence includes LCFIs corresponding to at least a portion of facial directions of the reference facial images. Accordingly, the LCFI sequence may be compared to the reference attribute sets to determine facial feature similarity between the live person subject and the user. In one or more embodiments, the pre-determined frame rate is chosen such that the LCFI sequence further includes additional LCFIs for the purpose to ensure that there is no breakage of facial image continuity in the LCFI sequence. In particular, any breakage of facial image continuity in the LCFI sequence suggests potential malicious act by the user, such as substituting his/her live face in front of the image sensor by pre-recorded facial images. In one or more embodiments, the pre-determined frame rate is a constant frame rate, such as 30 frames per second that is sufficiently high to capture any potential substituting act of the user. In one or more embodiments, the pre-determined frame rate is a variable frame rate, such as dynamically generated using the random sequence generation algorithm.

In Step 204, the sequence of LCFIs is analyzed for making authentication determinations in the following Steps 205 and 206.

In Step 205, a determination is made as to whether the sequence of LCFIs includes all reference facial images specified by the recognition phase instructions. If the determination is negative, i.e., at least one reference facial image specified by the recognition phase instructions is missing from the sequence of LCFIs, the method proceeds to Step 207 where the user is identified as not the same as the live person subject. In other words, if any reference facial image specified by the recognition phase instructions is not matched by comparing to the sequence of LCFIs, the user fails to be authenticated as the live person subject. In contrast, if the determination in Step 205 is positive, i.e., all reference facial images specified by the recognition phase instructions are present in the sequence of LCFIs, the method proceeds to Step 206 where LCFIs are checked for image continuity.

In one or more embodiments, to confirm the requirement in Step 205, target LCFIs are selected from the LCFIs sequence based on time points when each of the recognition phase instructions is presented during the recognition phase to the user. In addition, at least a portion of the reference attribute sets are selected corresponding to those reference facial images specified by the recognition phase instructions. Accordingly, the target LCFIs are compared to the selected portion of the reference attribute sets to determine whether the LCFIs sequence indeed include all reference facial images specified by the recognition phase instructions.

In Step 206, a determination is made as to whether the sequence of LCFIs is validated as free of any breakage of facial image continuity based on a pre-determined criterion. In one or more embodiments, this requirement only verifies if any LCFI is determined as not resembling a human face. In other words, if all LCFIs in the sequence satisfy a minimum requirement of resembling a human face, the sequence of LCFIs is validated. In one or more embodiments, to confirm this requirement, a difference measure between two consecutive LCFIs in each consecutive LCFI pair in the LCFIs sequence (114) is generated. The sequence of LCFIs is then validated as free of any breakage of facial image continuity if each of all difference measures is less than a pre-determined threshold. If the determination in Step 206 is positive, i.e., the sequence of LCFIs contains at least one discontinuity, the method proceeds to Step 207 where the user is identified as not the same as the live person subject. In contrast, if the determination in Step 205 is negative, i.e., all consecutive LCFI are seamlessly transitioned in the sequence of LCFIs, the method proceeds to Step 208 where the user is identified as the same as the live person subject. In one or more embodiments, when the user is identified as the same as the live person subject, i.e., properly authenticated, the user is allowed to access requested data content or program resources.

An example of authenticating live person subject is described in reference to FIGS. 3A-3B below. FIG. 3A shows a learning phase screenshot (300) illustrating the aforementioned dynamically generated instruction set for obtaining the reference facial images of the live person subject. As shown in FIG. 3A, each of the target 1 (301), target 2 (302), target 3 (303), target 4 (304), target 5 (305), target 6 (306), target 7 (307), target 8 (308), and target 9 (309) is a visual target location displayed on a computer screen that the live person subject is instructed to position his/her face toward during the learning phase. Only one of these visual target locations is displayed at one time during the sequence of the instructions. Following the instruction, a reference facial image (e.g., live-captured facial image (310), referred to as RFI 1 through 9) is captured from the live person subject with his/her face position accordingly. Further, an attribute set (referred to as AS 1 through 9) is extracted from each captured reference facial image. In other words, AS 1 corresponds to RFI 1, AS 2 corresponds to RFI 2, so on and so forth. As noted above, these visual target locations are dynamically and randomly generated, which means the number of such visual target locations and their particular location on the computer screen may be different for different live persons participating in the learning phase. Similarly, if the same live person participates in the learning phase more than once, the number of such visual target locations and their particular location on the computer screen may also vary from time to time.

FIG. 3B shows screenshot A (320a) through screenshot E (320e) illustrating the aforementioned randomly generated visual target locations during the recognition phase. Specifically, the randomly generated visual target locations include the target 3 (303), target 4 (304), target 5 (305), target 3 (303), and target 6 (306), using which a user to be authenticated is instructed to position his/her face toward. Following the sequence of recognition phase instructions, a sequence of LCFIs is captured, such as the LCFI A (321), LCFI B (322), LCFI C (323), LCFI D (324), and LCFI E (325) corresponding to the user's face positioned towards the target 3 (303), target 4 (304), target 5 (305), target 3 (303), and target 6 (306), respectively. In addition, in between each consecutive facial directions based on a 30 frame per second rate, filler LCFIs are also captured such that any potential malicious act of the user can be detected. For example, if the user attempts to substitute his/her live face in front of the computer camera by pre-recorded facial images, the discontinuity will be captured in these filler LCFIs during such attempts.

Figure 4:
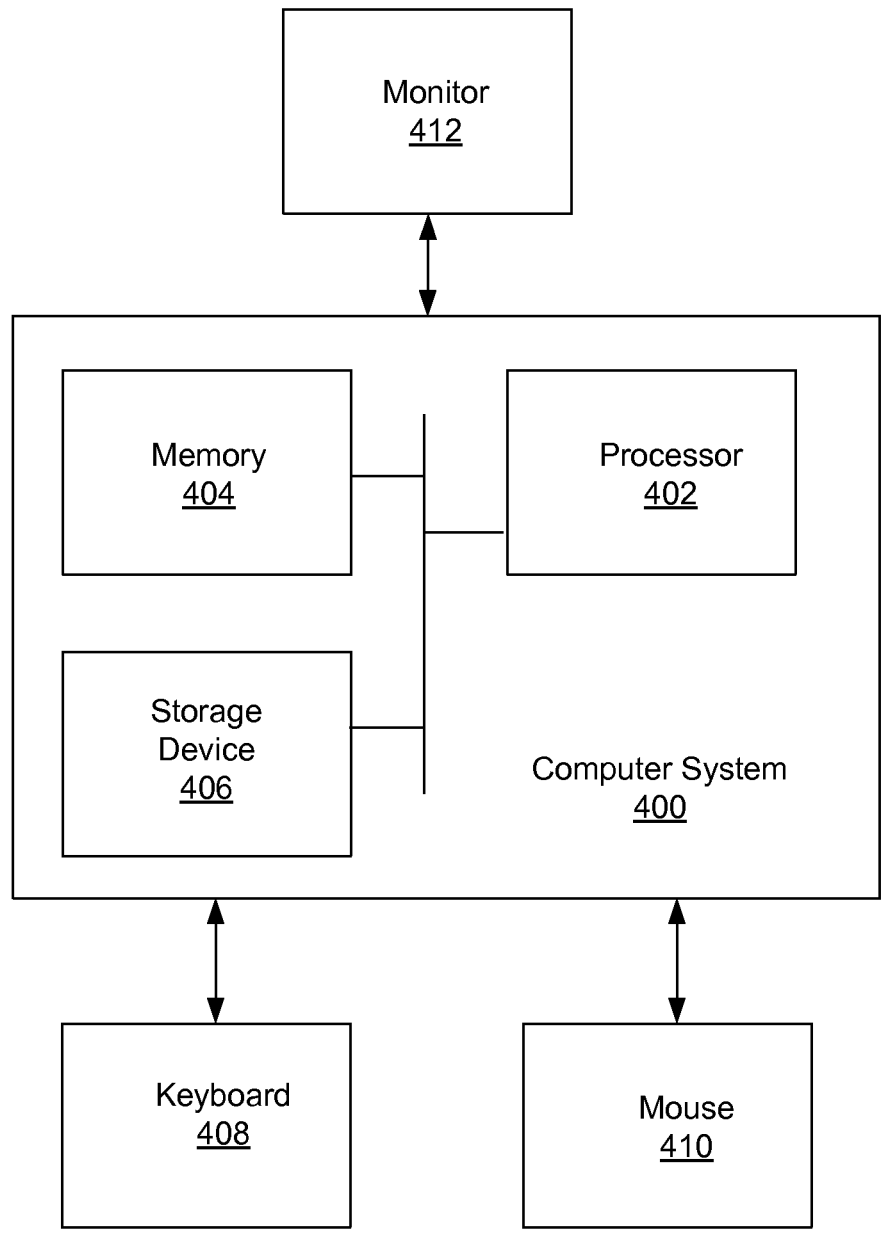
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to authenticate a live person subject, comprising:

receiving an authentication request from a user;

generating, in response to the authentication request, a sequence of instructions instructing the user to point a face of the user toward a sequence of facial directions, wherein the sequence of facial directions are randomly generated using a random sequence generation algorithm, wherein the sequence of facial directions correspond to a sequence of reference facial images of the live person subject;

presenting the sequence of instructions to the user, comprising:

presenting a first instruction at a first time point, wherein the first instruction instructs the user to point the face toward a first facial direction; and presenting a second instruction at a second time point, wherein the second instruction instructs the user to point the face toward a second facial direction, wherein the first time point and the second time point are determined based on instruction delays randomly generated using the random sequence generation algorithm;

capturing, while presenting the sequence of instructions to the user, a sequence of live-captured facial images (LCFIs) based on a pre-determined frame rate; and generating an authentication result identifying the user as the live person subject by at least:

matching a LCFI in the sequence of LCFIs to a first reference facial image of the live person subject toward the first facial direction; and matching another LCFI in the sequence of LCFIs to a second reference facial image of the live person subject toward the second facial direction; and validating each LCFI in the sequence of LCFIs based on a pre-determined criterion.

2. The method of claim 1, further comprising:

obtaining, during a learning phase prior to receiving the authentication request, a plurality of reference facial images of the live person subject corresponding to a plurality of facial directions of the live person subject, wherein the first reference facial image and the second reference facial image are obtained based on the plurality of reference facial images.

3. The method of claim 2, further comprising:

selecting the first reference facial image and the second reference facial image from the plurality of reference facial images based on the first facial direction and the second facial direction, wherein plurality of facial directions comprise the first facial direction and the second facial direction.

4. The method of claim 1, further comprising:

selecting the LCFI from the sequence of LCFIs based on the first time point when the first instruction is presented during presenting the sequence of instruction to the user; and selecting the another LCFI from the sequence of LCFIs based on the second time point when the second instruction is presented during presenting the sequence of instruction to the user.

5. The method of claim 1, wherein validating each LCFI in the sequence of LCFIs comprises:

generating a difference measure between two consecutive LCFIs in each consecutive LCFI pair in the sequence of LCFIs; and determining that each difference measure of all consecutive LCFI pairs in the sequence of LCFIs is less than a pre-determined threshold.

6. The method of claim 1, wherein the pre-determined frame rate is a constant frame rate.

7. The method of claim 1, wherein the pre-determined frame rate is a variable frame rate.

8. A system for authenticating a live person subject, comprising:

a computer processor;

a random instruction module executing on the computer processor and configured to:

receive an authentication request from a user;

generate, in response to the authentication request, a sequence of instructions instructing the user to point a face of the user toward a sequence of facial directions, wherein the sequence of facial directions are randomly generated using a random sequence generation algorithm, wherein the sequence of facial directions correspond to a sequence of reference facial images of the live person subject; and present the sequence of instructions to the user, comprising:

presenting a first instruction at a first time point, wherein the first instruction instructs the user to point the face toward a first facial direction; and presenting a second instruction at a second time point, wherein the second instruction instructs the user to point the face toward a second facial direction, wherein the first time point and the second time point are determined based on instruction delays randomly generated using the random sequence generation algorithm;

an image sensor coupled to the computer processor and configured to capture, while the sequence of instructions are being presented to the user, a sequence of live-captured facial images (LCFIs) based on a pre-determined frame rate;

an LCFI analyzer executing on the computer processor and configured to generate an authentication result identifying the user as the live person subject by at least:

matching a LCFI in the sequence of LCFIs to a first reference facial image of the live person subject toward the first facial direction; and matching another LCFI in the sequence of LCFIs to a second reference facial image of the live person subject toward the second facial direction; and validating each LCFI in the sequence of LCFIs based on a pre-determined criterion; and a repository configured to store the sequence of LCFIs, the first reference facial image, and the second reference facial image.

9. The system of claim 8, further comprising a reference facial image collector configured to:

obtain, during a learning phase prior to receiving the authentication request, a plurality of reference facial images of the live person subject corresponding to a plurality of facial directions of the live person subject, wherein the first reference facial image and the second reference facial image are obtained based on the plurality of reference facial images, and wherein the repository is further configured to store the plurality of reference facial images.

10. The system of claim 9, wherein the LCFI analyzer is further configured to:

select the first reference facial image and the second reference facial image from the plurality of reference facial images based on the first facial direction and the second facial direction, wherein plurality of facial directions comprise the first facial direction and the second facial direction.

11. The system of claim 8, wherein the LCFI analyzer is further configured to:

select the LCFI from the sequence of LCFIs based on the first time point when the first instruction is presented during presenting the sequence of instruction to the user; and select the another LCFI from the sequence of LCFIs based on the second time point when the second instruction is presented during presenting the sequence of instruction to the user, wherein the random instruction module is further configured to generate the instruction delays for presenting the sequence of instructions to the user.

12. The system of claim 8, wherein validating each LCFI in the sequence of LCFIs comprises:
- generating a difference measure between two consecutive LCFIs in each consecutive LCFI pair in the sequence of LCFIs; and
- determining that each difference measure of all consecutive LCFI pairs in the sequence of LCFIs is less than a pre-determined threshold.

13. The system of claim 8, wherein the pre-determined frame rate is a constant frame rate.

14. The system of claim 8, wherein the random instruction module is further configured to:
- generate, using the random sequence generation algorithm, the pre-determined frame rate as a variable frame rate.

15. A non-transitory computer readable medium embodying instructions for authenticating a live person subject, the instructions when executed by a processor comprising functionality for:
- receiving an authentication request from a user;
- generating, in response to the authentication request, a sequence of instructions instructing the user to point a face of the user toward a sequence of facial directions, wherein the sequence of facial directions are randomly generated using a random sequence generation algorithm, wherein the sequence of facial directions correspond to a sequence of reference facial images of the live person subject;
- presenting the sequence of instructions to the user, comprising:
  - presenting a first instruction at a first time point, wherein the first instruction instructs the user to point the face toward a first facial direction; and
  - presenting a second instruction at a second time point, wherein the second instruction instructs the user to point the face toward a second facial direction,
  - wherein the first time point and the second time point are determined based on instruction delays randomly generated using the random sequence generation algorithm;
- capturing, while presenting the sequence of instructions to the user, a sequence of live-captured facial images (LCFIs) based on a pre-determined frame rate; and
- generating an authentication result identifying the user as the live person subject by at least:
  - matching a LCFI in the sequence of LCFIs to a first reference facial image of the live person subject toward the first facial direction; and
  - matching another LCFI in the sequence of LCFIs to a second reference facial image of the live person subject toward the second facial direction; and
  - validating each LCFI in the sequence of LCFIs based on a pre-determined criterion.

16. The non-transitory computer readable medium of claim 15, the instructions when executed by the processor further comprising functionality for:
- obtaining, during a learning phase prior to receiving the authentication request, a plurality of reference facial images of the live person subject corresponding to a plurality of facial directions of the live person subject,
- wherein the first reference facial image and the second reference facial image are obtained based on the plurality of reference facial images.

17. The non-transitory computer readable medium of claim 15, the instructions when executed by the processor further comprising functionality for:
- selecting the first reference facial image and the second reference facial image from the plurality of reference facial images based on the first facial direction and the second facial direction,
- wherein plurality of facial directions comprise the first facial direction and the second facial direction.

18. The non-transitory computer readable medium of claim 15, the instructions when executed by the processor further comprising functionality for:
- selecting the LCFI from the sequence of LCFIs based on the first time point when the first instruction is presented during presenting the sequence of instruction to the user; and
- selecting the another LCFI from the sequence of LCFIs based on the second time point when the second instruction is presented during presenting the sequence of instruction to the user.

19. The non-transitory computer readable medium of claim 15, wherein validating each LCFI in the sequence of LCFIs comprises:
- generating a difference measure between two consecutive LCFIs in each consecutive LCFI pair in the sequence of LCFIs; and
- determining that each difference measure of all consecutive LCFI pairs in the sequence of LCFIs is less than a pre-determined threshold.

\* \* \* \* \*